US010282424B2

(12) United States Patent
Zholudev et al.

(10) Patent No.: US 10,282,424 B2
(45) Date of Patent: May 7, 2019

(54) LINKING DOCUMENTS USING CITATIONS

(71) Applicant: ResearchGate GmbH, Berlin (DE)

(72) Inventors: Vyacheslav Zholudev, Berlin (DE); Michael Häusler, Berlin (DE); Ijad Madisch, Berlin (DE); Horst Fickenscher, Berlin (DE); Darren Alvares, Berlin (DE)

(73) Assignee: ResearchGate GmbH, Berlin (DE)

( * ) Notice: Subject to any disclaimer, the term of this patent is extended or adjusted under 35 U.S.C. 154(b) by 260 days.

(21) Appl. No.: 15/159,028

(22) Filed: May 19, 2016

(65) Prior Publication Data

US 2016/0342591 A1    Nov. 24, 2016

Related U.S. Application Data

(60) Provisional application No. 62/163,728, filed on May 19, 2015, provisional application No. 62/171,056, filed on Jun. 4, 2015.

(51) Int. Cl.
  *G06F 17/30* (2006.01)
  *G06Q 30/02* (2012.01)
  *H04L 29/06* (2006.01)
  *H04L 29/08* (2006.01)

(52) U.S. Cl.
  CPC .... *G06F 17/30011* (2013.01); *G06F 17/3053* (2013.01); *G06F 17/30867* (2013.01); *G06Q 30/02* (2013.01); *H04L 67/02* (2013.01); *H04L 67/1044* (2013.01); *H04L 67/22* (2013.01); *H04L 67/42* (2013.01)

(58) Field of Classification Search
  CPC ......... G06F 17/30011; G06F 17/30867; G06F 17/3053; H04L 67/22; H04L 67/1044; H04L 67/42; H04L 67/02; G06Q 30/02
  See application file for complete search history.

(56) References Cited

U.S. PATENT DOCUMENTS

| 8,930,392 | B1 | 1/2015 | Leichter |
| 9,753,922 | B2 | 9/2017 | Haeusler et al. |
| 9,916,365 | B1 * | 3/2018 | Dick ................. G06F 17/30728 |

(Continued)

OTHER PUBLICATIONS

"European Application Serial No. 16170497.8, Summons to Attend Oral Proceedings mailed May 4, 2018", 8 pgs.

(Continued)

*Primary Examiner* — Alexander Khong

(74) *Attorney, Agent, or Firm* — Schwegman Lundberg & Woessner, P.A.

(57) ABSTRACT

Aspects of the present disclosure relate to linking documents using citations. A server accesses a stored document in a data repository. The server determines a set of candidate citing documents that cite the stored document. The server obtains, for each candidate citing document from the set, first information representing an impact of the candidate citing document taken as a whole and second information representing a citation context within the candidate citing document. The server determines a subset of citing documents, from the set of candidate citing documents, based on the obtained first information and the obtained second information. The server provides a digital transmission of the stored document, including visible indicia of the subset of citing documents, for display at a client device.

18 Claims, 10 Drawing Sheets

(56) References Cited

U.S. PATENT DOCUMENTS

| | | |
|---|---|---|
| 2001/0051897 A1 | 12/2001 | Loeb et al. |
| 2003/0163416 A1 | 8/2003 | Kitajima |
| 2005/0080815 A1 | 4/2005 | Inoue et al. |
| 2008/0086680 A1* | 4/2008 | Beckman .............. G06F 17/211 715/230 |
| 2012/0233152 A1* | 9/2012 | Vanderwende ... G06F 17/30728 707/722 |
| 2012/0284290 A1 | 11/2012 | Keebler et al. |
| 2013/0159110 A1 | 6/2013 | Rajaram et al. |
| 2013/0218634 A1 | 8/2013 | Hills et al. |
| 2013/0268405 A1 | 10/2013 | Yeh |
| 2014/0006424 A1* | 1/2014 | Al-Kofahi ............... G06F 17/30 707/754 |
| 2014/0075018 A1 | 3/2014 | Maycotte et al. |
| 2015/0012449 A1 | 1/2015 | Jackson et al. |
| 2015/0039406 A1 | 2/2015 | Dubey et al. |
| 2015/0154691 A1 | 6/2015 | Curry et al. |
| 2015/0262069 A1 | 9/2015 | Gabriel et al. |
| 2016/0344828 A1 | 11/2016 | Hausler et al. |
| 2017/0344541 A1 | 11/2017 | Haeusler et al. |
| 2018/0232367 A1 | 8/2018 | Häusler et al. |
| 2018/0246888 A1 | 8/2018 | Zholudev et al. |

OTHER PUBLICATIONS

Dejean, Herve, "A System for Converting PDF Documents into Structured XML Format", ECCV 2016 Conference; [Lecture Notes in Computer Science; Lect.Notes Computer], Springer International Publishing, Cham, (Feb. 13, 2006), 129-140.

"European Application Serial No. 16170497.8, Response filed Dec. 18, 2017 to Communication pursuant to Article 94(3) EPC dated Jul. 8, 2017", 15 pgs.

"U.S. Appl. No. 15/158,989, First Action Interview—Office Action Summary dated Oct. 17, 2016", 15 pgs.

"U.S. Appl. No. 15/158,989, First Action Interview—Pre-Interview Communication dated Aug. 23, 2016", 14 pgs.

"U.S. Appl. No. 15/158,989, First Action Interview—Response filed Dec. 19, 2016 to Office Action Summary dated Oct. 17, 2016", 9 pgs.

"U.S. Appl. No. 15/158,989, Notice of Allowance dated Feb. 9, 2017", 9 pgs.

"U.S. Appl. No. 15/158,989, Notice of Allowance dated Jun. 9, 2017", 5 pgs.

"U.S. Appl. No. 15/158,989, Response filed Sep. 23, 2016 to Pre-Interview Communication", 4 pgs.

"European Application Serial No. 16170497.8, Communication pursuant to Article 94(3) EPC dated Jul. 8, 2017", 8 pgs.

"European Application Serial No. 16170497.8, Extended European Search Report dated Oct. 13, 2016", 10 pgs.

"European Application Serial No. 16170497.8, Response filed May 23, 2017 to Extended European Search Report dated Oct. 13, 2016", w/ English Translation, 18 pgs.

Huang, Jeff, et al., "No Clicks, No Problem: Using Cursor Movements to Understand and Improve Search", Human Factors in Computing Systems, ACM, 2 Penn Plaza, Suite 701, New York NY 10121-0701 USA, (May 7, 2011), 1225-1234.

Nayak, Amol, "MongoDB Cookbook", In: "MongoDB Cookbook", Packt Publishing, XP055299231, (Nov. 30, 2014), 106-110.

Tewari, Anand Shankar, et al., "Book recommendation system based on combine features of content based filtering, collaborative filtering and association rule mining", 2014 IEEE International Advance Computing Conference (IACC), IEEE, (Feb. 21, 2014), 500-503.

Wu, Lili, et al., "The Browsemaps: Collaborative Filtering at LinkedIn", Proceedings of the 6th Workshop on Recommender Systems and the Social Web (RSWeb 2014), Retrieved from the Internet<URL:http://ceur-ws.org/Vol-1271/Paper3.pdf> [retrieved on Aug. 30, 2016], (Oct. 6, 2014).

U.S. Appl. No. 15/950,010, filed Apr. 10, 2018, Enhanced Online User-Interaction Tracking.

U.S. Appl. No. 15/965,666, filed Apr. 27, 2018, Enhanced Online User-Interaction Tracking and Document Rendition.

U.S. Appl. No. 16/146,545, filed Sep. 28, 2018, Enhanced Online User-Interaction Tracking and Document Rendition.

"European Application Serial No. 16170497.8, Response filed Nov. 12, 2018 to Summons to Attend Oral Proceedings mailed May 4, 2018", 38 pgs.

"U.S. Appl. No. 16/146,545, Non Final Office Action dated Nov. 28, 2018", 14 pgs.

* cited by examiner the subgenus (species) [1]. Recently a new strain of HAdV was discovered and has been classified as HAdV-52, representing a putative new species G [4].

Human adenoviruses (HAdV) are causing a broad spectrum of diseases. One of the most severe forms of adenovirus infection is a disease resulting in significant morbidity and mortality. Several reports in recent years have identified HAdV-3I from species A (HAdV-A3I) as a cause of disseminated disease in small children following CITATION *referencing* THIS PAPER "For PCR amplification, the previously published genome sequence of HAdV-A3I (Hofmayer et al., 2009) was used to design new…"

ARTICLE *by* YUKI MATSUSHIMA · HIDEAKI SHI…
GO TO ARTICLE · REPLY

FIG. 7

LINKING DOCUMENTS USING CITATIONS

RELATED APPLICATIONS

This application claims priority to U.S. Provisional Patent Application No. 62/163,728, filed on May 19, 2015, and titled "TRACKING ONLINE USER INTERACTIONS WITH PUBLISHED CONTENT," and to U.S. Provisional Patent Application No. 62/171,056, filed Jun. 4, 2015, and titled "TRACKING ONLINE USER INTERACTIONS WITH PUBLISHED CONTENT," the entire content of which is incorporated herein by reference.

TECHNICAL FIELD

The subject matter disclosed herein relates to data processing. In particular, example embodiments may relate to linking documents using citations.

BACKGROUND

Oftentimes, researchers publish their works in journals, which are read by other people in their fields. A person reading an article in a journal may access the article, and may view other works cited by the article in the reference section. However, accessing these works may be challenging and may require purchasing a subscription to another journal. As the foregoing illustrates, a new approach for handling citations in articles may be desirable.

BRIEF DESCRIPTION OF THE DRAWINGS

Various ones of the appended drawings merely illustrate example embodiments of the present inventive subject matter and cannot be considered as limiting its scope.

FIG. 7 is a user interface diagram illustrating an example of incorporation of an excerpt from a citing document in the display of a document being cited.

DETAILED DESCRIPTION

Figure 1:
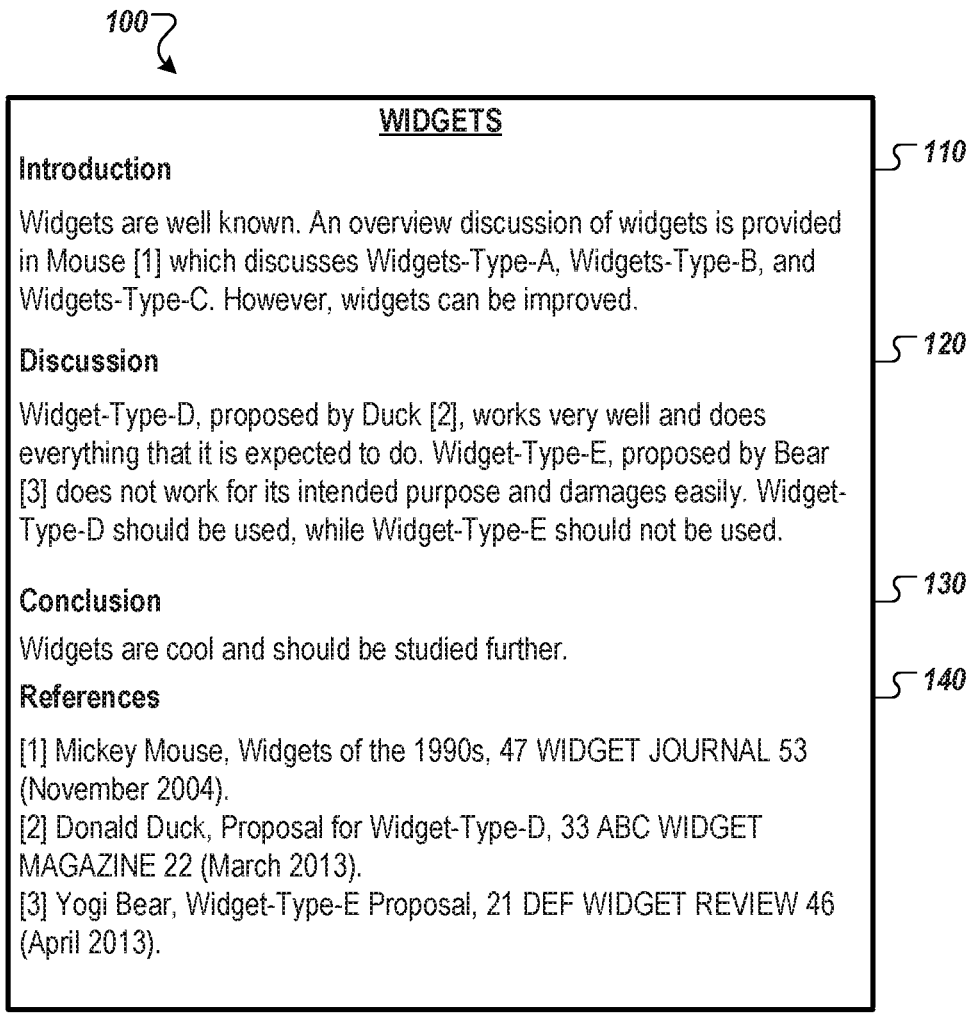
FIG. 1 is a diagram of an example document.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As noted above, a new approach for handling citations in articles may be desirable. In some embodiments, the subject technology provides techniques for linking documents using citations. A server accesses a first document from a data repository. The first document includes text arranged according to a layout. In one example, the first document is a portable document format (PDF) file of an article from a scholarly journal, with the text being the text from the article and the layout being set by the scholarly journal. The server uses a first machine learning algorithm to identify, within the first document, a reference section based on the text and the layout. The server uses a second machine learning algorithm to identify a cited reference (or multiple cited references) within the reference section based on the text and the layout within the reference section. The server uses a third machine learning algorithm to extract, from the identified cited reference, identifying information of the cited reference. The identifying information includes one or more of a title, an author, a date, a publication, a page number, a journal, a volume, an issue number, a date of issue, and the like. The identifying information is used to search the data repository for a second document that corresponds to the cited reference that was cited in the reference section of the first document. The server stores, within the data repository, an edge between the first document and the second document, the edge identifies that the first document cites the second document.

In some embodiments, the data repository is implemented using a graph database that stores, as nodes, a collection of documents. The documents/nodes are linked to one another via two-way edges that indicate that one document cites or is cited by another document. In this way, the graph database may be used to obtain intelligence about documents that a given document cites or documents that are cited by a given document.

FIG. 1 is a diagram of an example document 100. The example document 100 may be presented at a client device, as discussed in conjunction with FIG. 2. While the document 100 is relatively small (one page) for simplicity of illustration, the subject technology may be implemented with longer documents. As shown, the document 100 has a title, "WIDGETS," and is subdivided into sections: introduction 110, discussion 120, conclusion 130, and references 140. The sections 110, 120, 130, and 140 are identifiable using the text and layout of the document 100.

The reference section 140 includes three references: [1], [2], and [3]. These references correspond to other documents which are identified by author, title, edition, journal name, page, and date. For example, reference [1] has the author "Mickey Mouse," the title "Widgets of the 1990s," the edition 47, the journal name, "WIDGET JOURNAL," the page 53, and the date November 2004. The identifying information (e.g., author, title, edition, journal name, page, and date) can be used to find the document cited by reference [1] either in a paper copy in a library or in an electronic copy stored in a data repository.

The references are discussed in the document 100 within the introduction 110, discussion 120, or conclusion 130 sections, as indicated in the document 100. For example, reference [1] is cited in the second line of text of the introduction, reference [2] is cited in the first line of the discussion, and reference [3] is cited in the third line of the discussion. In some cases, the references in the references section 140 include selectable links (e.g., hyperlinks) for viewing the cited documents.

FIG. 1 illustrates an example of a layout for a document 100 and an example of identifying information that may be included in citations in the reference section 140. However, in other implementations, different layouts or different identifying information for citations can be used. For example, a reference may be identified with a uniform resource locator (URL) in addition to or in place of the author, title, edition, journal name, page, and date.

Figure 2:
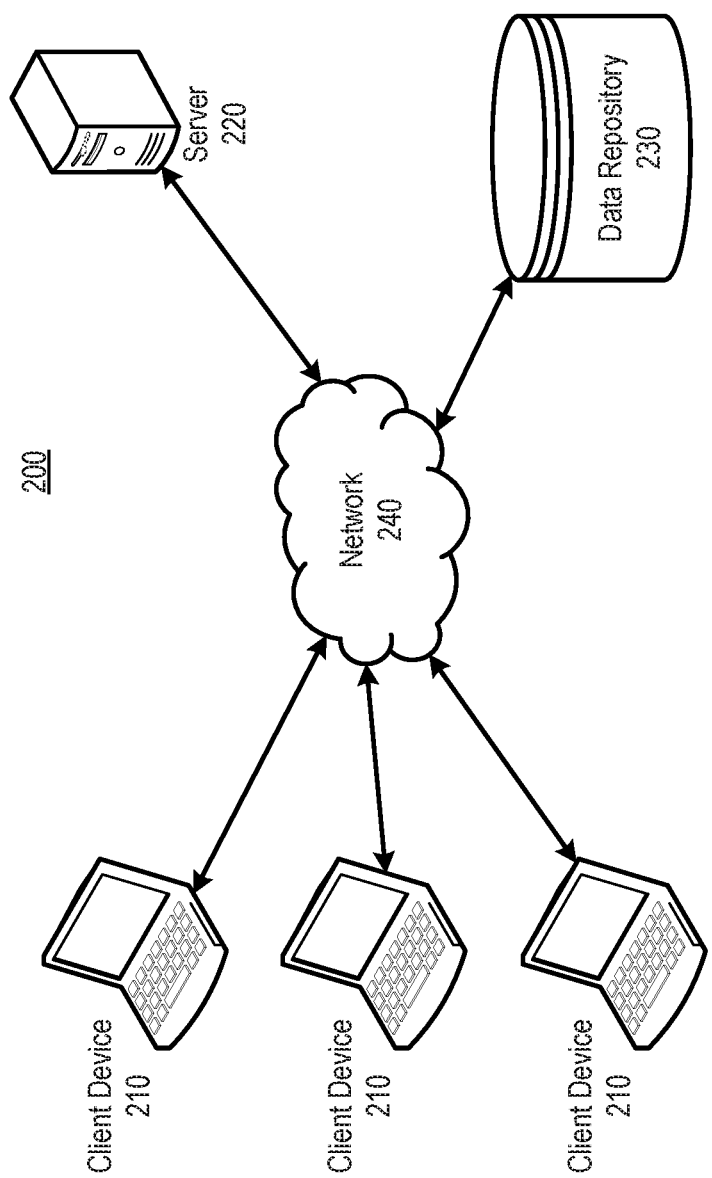
FIG. 2 is a diagram of an example system in which linking documents using citations may be implemented.

FIG. 2 is a diagram of an example system 200 in which linking documents using citations may be implemented. As shown, the system 200 includes client device(s) 210, a server 220, and a data repository 230 connected to one another via a network 240. The network 240 may include one or more of the Internet, an intranet, a local area network, a wide area network (WAN), a cellular network, a WiFi network, a virtual private network (VPN), a public network, a wired network, a wireless network, etc. Aspects of the subject technology are implemented at the server 220, which accesses and stores data at the data repository 230.

The client device(s) 210 may include one or more of a laptop computer, a desktop computer, a mobile phone, a tablet computer, a personal digital assistant (PDA), a digital music player, a smart watch, and the like. The client device 210 may include an application (or multiple applications), such as a web browser or a special purpose application, for communicating with the server 220 and the data repository 230. Using the application, a user of the client device 210 may access and interface with documents stored in the data repository 230 using the techniques described herein. While three client devices 210 are illustrated in FIG. 2, the subject technology may be implemented with any number of client device(s) 210. The client device 210 may provide for display the document 100 of FIG. 1 or the interface discussed in conjunction with FIG. 7.

The server 220 stores data or instructions. The server 220 is programmed to access documents in the data repository 230 and to link the documents in the data repository 230 based on citations. More details of the operation of the server 220 are provided throughout this document, for example, in conjunction with FIGS. 4-5.

The data repository 230 stores information about documents and the citations in the documents. The data in the data repository 230 is accessible to the server 220. More details of the operation of the data repository 230 are provided throughout this document, for example, in conjunction with FIG. 3.

In the implementation illustrated in FIG. 2, the system 200 includes a single data repository 230 and a single server 220. However, the subject technology may be implemented with multiple data repositories or multiple servers. Furthermore, as shown in FIG. 2, a single network 240 connects the client device(s) 210, the server 220, and the data repository 230. However, the subject technology may be implemented using multiple networks to connect the machines. Additionally, while the server 220 and the data repository 230 are illustrated as being distinct machines, in some examples, a single machine functions as both the server 220 and the data repository 230.

Figure 3:
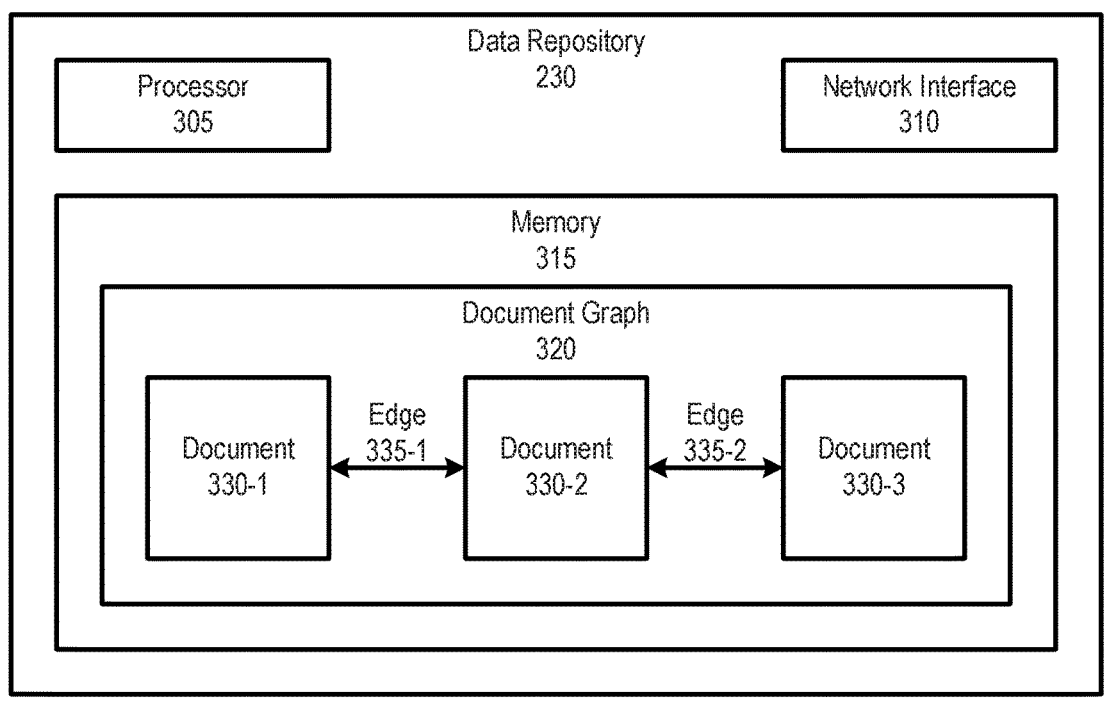
FIG. 3 is a block diagram of an example of the data repository of FIG. 2.

FIG. 3 is a block diagram of an example of the data repository 230 of FIG. 1. As shown, the data repository 230 includes a processor 305, a network interface 310, and a memory 315. The processor 305 executes machine instructions, which may be stored in the memory 315. While a single processor 305 is illustrated, the data repository 230 may include multiple processors arranged into multiple processing units (e.g., central processing unit (CPU), graphics processing unit (GPU), etc.). The processor 305 includes one or more processors. Alternatively, the data repository 230 may be implemented without the processor 305 and may provide access to its memory 315 to other machines on the network 240 that have processors. The network interface 310 allows the data repository 230 to send and receive data via the network 240. The network interface 310 includes one or more network interface cards (NICs). The memory 315 stores data or instructions. As shown, the memory 315 includes a document graph 320.

The document graph 320 stores multiple documents 330 linked to one another via multiple edges 335. As shown, there are three documents 330-1, 330-2, and 330-3 and two edges 335-1 and 335-2. However, the document graph 320 can store any number of documents 330 or edges 335. Each document 330 includes text arranged according to a layout, for example, as shown in FIG. 1. A document 330 may correspond to the document 100 of FIG. 1. An edge 335 between two documents 330 indicates that one document cites the other document as a reference. For example, the edge 335-1 between document 330-1 and document 330-2 indicates that either document 330-1 cites document 330-2 as a reference or vice versa. (In some aspects, the edge 335-1 stores information indicating which is the citing document and which is the cited document.) As shown, the edge 335-1 is bi-directional and can be used to move from document 330-1 to document 330-2 and vice versa. In other words, the edge 335-1 can be used to move from the cited document to the citing document and vice versa. In this manner, a human user or a machine accessing the data repository 230 can gain insight into which other documents cite a given document or which documents are cited by a given document.

In some examples, the data repository 230 is implemented as a graph database that store the document graph 320. In the graph database examples, the documents 330 are the nodes in the graph and the edges 335 are the edges in the graph. Alternatively, any data storage structure can be used to implement the data repository 230.

Figure 4:
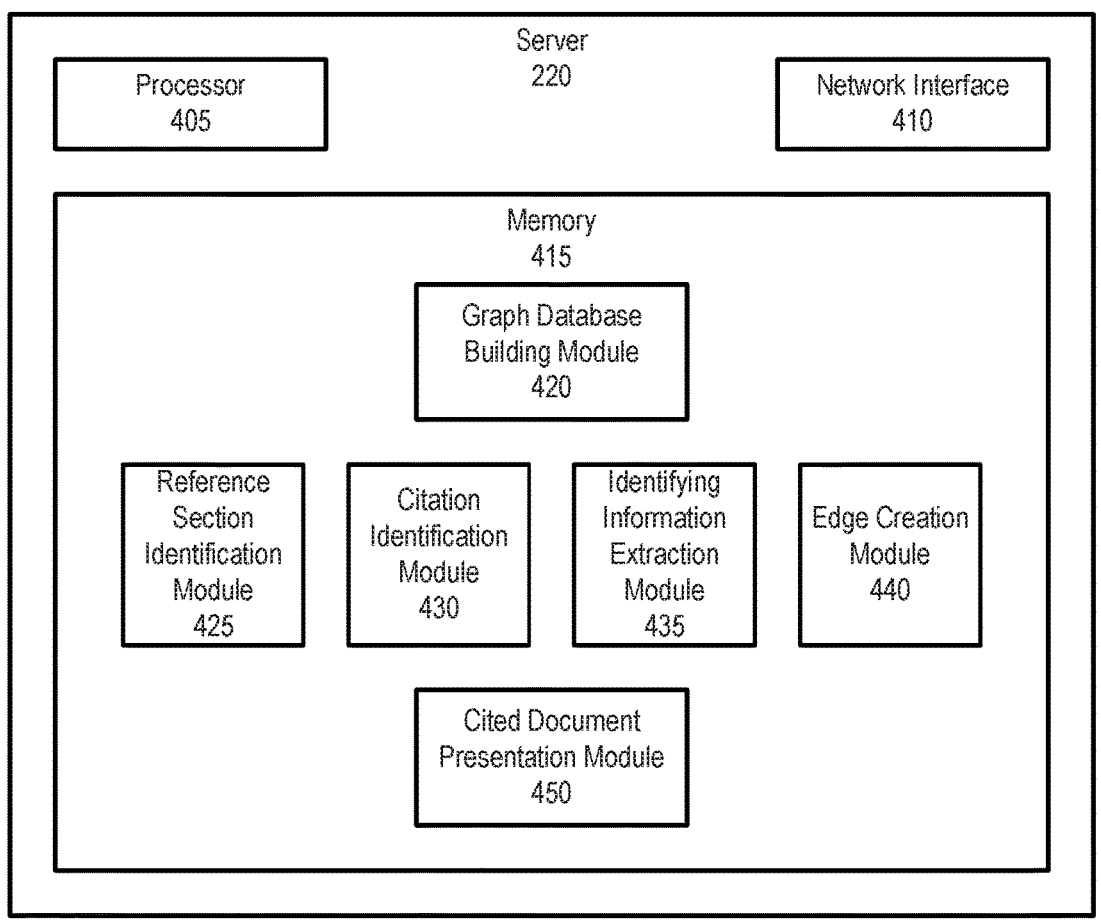
FIG. 4 is a block diagram of an example of the server of FIG. 2.

FIG. 4 is a block diagram of an example of the server 220 of FIG. 1. As shown, the server 220 includes a processor 405, a network interface 410, and a memory 415. The processor 405 executes machine instructions, which may be stored in the memory 415. While a single processor 405 is illustrated, the server 220 may include multiple processors arranged into multiple processing units (e.g., central processing unit (CPU), graphics processing unit (GPU), etc.). The processor 405 includes one or more processors. The network interface 410 allows the server 220 to send and receive data via the network 240. The network interface 410 includes one or more network interface cards (NICs). The memory 415 stores data or instructions. As shown, the memory 415 includes a graph database building module 420, a reference section identification module 425, a citation identification module 430, an identifying information extraction module 435, an edge creation module 440, and a cited document presentation module 450.

The graph database building module 420 is configured to build the document graph 320, either from scratch or by adding edges 335 or documents 330 to the document graph 320. The graph database building module 420, upon receiving (e.g., from the client device 210) a new document for placement in the document graph 320, adds the document to the document graph 320 as one of the documents 330. To add edges 335 to the document graph 320, the graph database building module 420 is configured to invoke the reference section identification module 425, the citation identification module 430, the identifying information extraction module 435, and the edge creation module 440, to carry out the functions described below.

The reference section identification module 425 is configured to identify, within a first document accessed by the graph database building module 420 (e.g., for the purpose of adding edges to the first document). The first document includes text arranged according to a layout. The first document may correspond to the document 100 or the document 330. In some examples, the reference section identification module 425 is configured to identify, within the first document, multiple sections (e.g., sections 110, 120, 130, and 140 of the document 100). Each section has a section header (e.g., "Introduction," "Discussion," "Conclusion," and "References" for the sections 110, 120, 130, and 140, respectively, of the document 100). The section header is identified, for example, based on its font (e.g., bold in the document 100) or other stylistic information. The reference section identification module 425 is configured to identify the reference section 140 based on text in the section header. The text is "References" in the section 140 of FIG. 1. However, in other examples, different text, such as "footnotes," "endnotes," "bibliography," or "citations," may be used. In yet other examples, the reference section may be separated from the other sections, for example, by a line drawn at the bottom of the page, with text of the body of the document appearing above the line and citations appearing below the line.

In some implementations, the reference section identification module 425 is trained using machine learning. The training set includes multiple documents with the locations of the reference sections identified by human users. Using machine learning, the machine (e.g., the server 220) develops programmatic rules for identifying the reference section, stores those rules in memory, and applies those rules to locate the reference section in another document presented to the machine after the programmatic rules have been developed.

The citation identification module 430 is configured to identify a citation to a cited reference (or multiple citations to multiple cited references) within the reference section, identified by the reference section identification module 425, based on the text and the layout within the reference section. In some cases, the cited reference is identified based on line endings, punctuation marks, or different fonts, sizes, and styles within the reference section. For example, in FIG. 1, each of the citations [1], [2], and [3] begins with a newline character followed by a [ character, and ends with a period followed by a newline character. Other techniques may also be used to separate references. For example, a reference may begin with a number written in superscript and may end with a newline character that is not followed by a period, or with a period that is not followed by a newline character.

In some implementations, the citation identification module 430 is trained using machine learning. The training set includes multiple documents with the cited references identified by human users. Using machine learning, the machine (e.g., the server 220) develops programmatic rules for identifying the citations to the cited references, stores those rules in memory, and applies those rules to locate the reference section in another document presented to the machine after the programmatic rules have been developed. The training data provided to the machine includes a pre-labeled (e.g., by a human) set of tokens, as discussed below in conjunction with Table 2. The machine uses these tokens to learn to identify and label similar tokens from other citations.

The identifying information extraction module 435 is configured to extract, from each citation identified by the citation identification module 430, identifying information of the cited reference. The identifying information includes, for example, a title, an author, a date, a publication, a journal name, a publisher name, an edition number, a page number, URL, a journal, a volume, an issue number, a date of issue, and the like. In some cases, the identifying information extraction module 435 operates by applying named entity recognition to extract the identifying information. In one example, the input provided to the identifying information extraction module 435 is "[2] Donald Duck, Proposal for Widget-Type-D, 33 ABC WIDGET MAGAZINE 22 (March 2013)." (Taken from FIG. 1.) The output is: author—Donald Duck; title—Proposal for Widget-Type-D; edition—33; publication—ABC WIDGE T MAGAZINE; page—22; and date—March 2013. The input for named entity recognition is a set of tokens, as shown, for example, in Table 1. The output from named entity recognition is tokens with labels, as shown, for example, in Table 2. Machine learning is used to determine a probability that a given token corresponds to a given label, and the label having the highest probability is provided as the output. For instance, if the word WIDGET has an 86% probability of having the label <publication> and a 10% probability of having the label <title>, the output for the word WIDGET is the label <publication>, as illustrated in Table 2.

TABLE 1

| Tokens |
| --- |
| [2] |
| Donald |
| Duck |
| , |
| Proposal |
| for |
| Widget-Type-D |
| , |
| 33 |
| ABC |
| WIDGET |
| MAGAZINE |
| 22 |
| ( |
| March |
| 2013 |
| ) |
| . |

TABLE 2

| Tokens with Labels |
| --- |
| [2] <citation_label> |
| Donald <name> |
| Duck <name> |
| , <other> |
| Proposal <title> |
| for <title> |

TABLE 2-continued

Tokens with Labels

Widget-Type-D <title>
, <other>
33 <edition_number>
ABC <publication>
WIDGET <publication>
MAGAZINE <publication>
22 <page_number>
( <other>
March <date>
2013 <date>
) <other>
. <other>

In assigning labels to the tokens, the machine (e.g., server 220) implementing the machine learning may take several factors into account. For example, capitalization and punctuation can be taken into account to locate boundaries between different labels and identify various labels. For instance, a comma may represent a border between the name of the author and the title. Furthermore, names of authors typically begin with a capital letter. In addition, a list (or other data structure) of first and last names, geographic locations, or journal names, may be used to identify a token as corresponding to a name, a geographic location, or a publication.

While FIG. 1 illustrates citations in the references section 140 having a single citation format, the subject technology may be used with multiple different citation formats. Some common citation formats (e.g., citation formats from *The Bluebook*, published and distributed by the Harvard Law Review Association of Cambridge, Mass., and the like) may be programmed into the machine for machine learning purposes. However, in addition, the machine may include machine learning programming that would allow the machine to identify and add labels to substantially arbitrary citation formats. In some cases, the citation format being used may be inferred, by the machine, based on a type of document being processed by the machine, and structured information extraction can be used. For example, legal documents are likely to *The Bluebook* citation format. If the citation format is known, labels can be assigned to tokens based on the known citation format. For example, in a citation format where the title follows the author's name, the label following the author's name is likely to be the title.

The edge creation module 440 identifies, based on the identifying information of the cited reference from the first document, a second document corresponding to the cited reference. The edge creation module stores, within the document graph 320 of the data repository 230, an edge (e.g., edge 335-1) between the first document (e.g., document 330-1) and the second document (e.g., document 330-2). The edge identifies that the first document cites the second document. In some cases, the edge is a two-way edge allowing a user or machine accessing the first document to know that the first document cites the second document, and allowing a user or machine accessing the second document to know that the second document is cited by the first document. In some cases, the edge creation module modifies the first document, stored in the data repository 230, to include a selectable link (e.g., a hyperlink) to the second document overlaying the citation of the second document within the first document. For instance, in the example of FIG. 1, a link to the article "Proposal for Widget-Type-D" by Donald Duck could overlay reference [2] in the reference section 140.

The cited document presentation module 450 is configured to access a stored document 330 in a data repository 230; determine a set of candidate citing documents 330 that cite the stored document; compute, for each candidate citing document from the set, a first score based on a sentiment applied to the stored document and a second score based on a citation context within the candidate citing document; determine a subset of citing documents, from the set of candidate citing documents, based on the computed first score and the computed second score; and provide a digital transmission of the stored document, including visible indicia of the subset of citing documents, for display at a client device 210. An example of the displayed information is provided in conjunction with FIG. 7, discussed below. More details of the operation of the cited document presentation module 450 are provided below in conjunction with FIG. 10.

As used herein, the term "configured" encompasses its plain and ordinary meaning. A module (e.g., module 420, 425, 430, 435, 440, or 450) may be configured to carry out operation(s) by storing code for the operation(s) in memory (e.g., memory 415). Processing hardware (e.g., processor 405) may carry out the operations by accessing the appropriate locations in the memory. Alternatively, the module may be configured to carry out the operation(s) by having the operation(s) hard-wired in the processing hardware.

Figure 5:
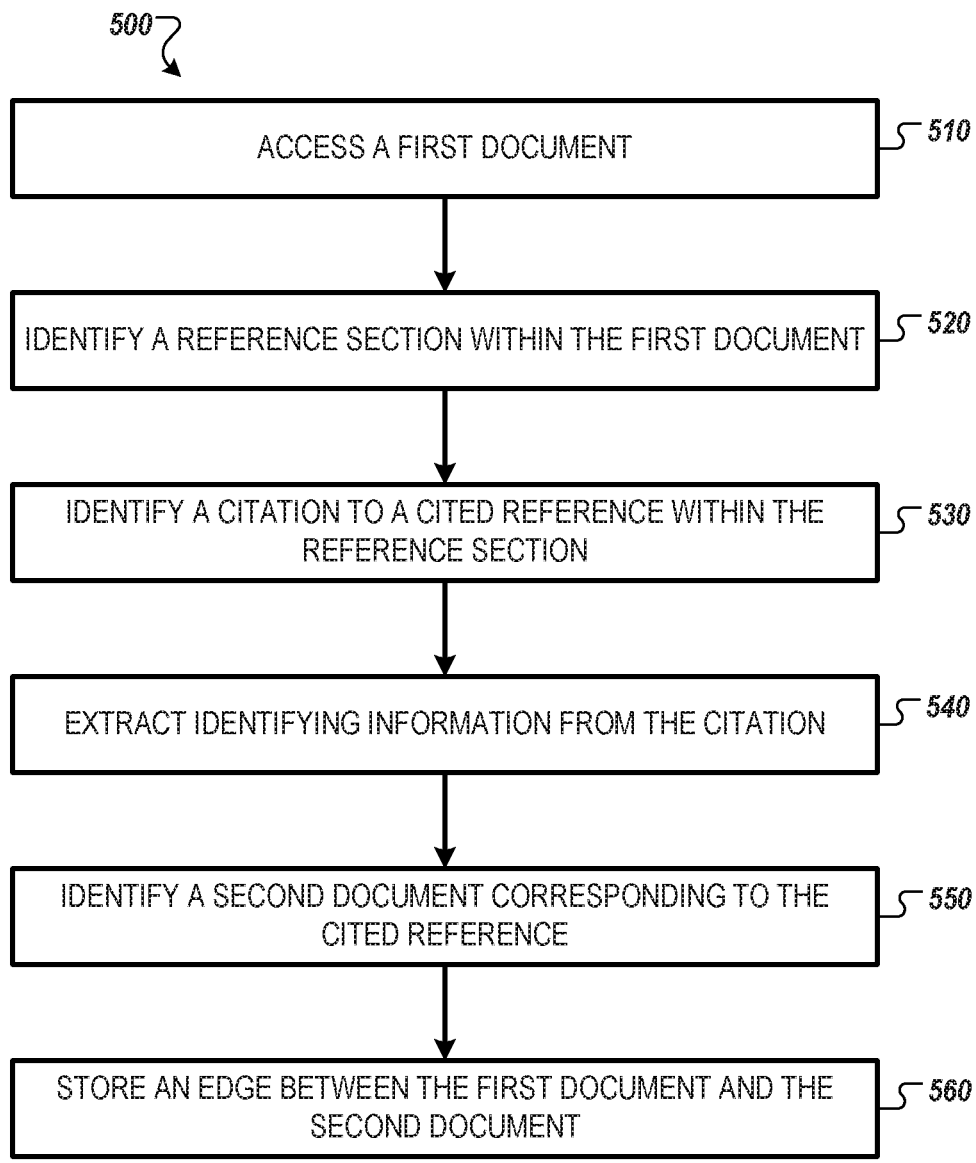
FIG. 5 is a flow chart illustrating an example method for linking documents using citations.

FIG. 5 is a flow chart illustrating an example method 500 for linking documents using citations. In some examples, the method 500 is implemented at the server 220, which accesses the data repository 230.

The method 500 begins at operation 510, where the server 220 accesses a first document from the data repository 230. The first document includes text arranged according to a layout, for example, as shown in FIG. 1. In some cases, the first document is a PDF file.

At operation 520, the server 220 identifies, within the first document, a reference section based on the text and the layout. In some cases, the reference section is identified using the reference section identification module 425, as discussed in conjunction with FIG. 4.

At operation 530, the server 220 identifies a citation to a cited reference (or multiple citations to multiple cited references) within the reference section based on the text and the layout within the reference section. In some cases, the citation is identified using the citation identification module 430, as discussed in conjunction with FIG. 4.

At operation 540, the server 220 extracts identifying information from the citation. The identifying information includes, for example, a title, an author, a date, a publication, a journal name, a publisher name, an edition number, a page number, a URL, and the like. In some cases, the identifying information is extracted using the identifying information extraction module 435, as discussed in conjunction with FIG. 4.

At operation 550, the server 220 identifies, based on the identifying information, a second document corresponding to the cited reference. In some cases, the second document is identified by searching the data repository 230 for documents having the identifying information identified by the server 220 when implementing operation 540. The data repository 230 may be optimized for searching for documents based on identifying information. For instance, the identifying information may correspond to keys and the documents (or links to the documents) may correspond to values in a key-value table stored in the data repository 230.

At operation 560, the server 220 stores, within the data repository 230, an edge between the first document and the second document. The edge identifies that the first document cites the second document. In some cases, the edge is stored using the edge creation module 440, as discussed in conjunction with FIG. 4. After operation 560, the method 500 ends.

Figure 6:
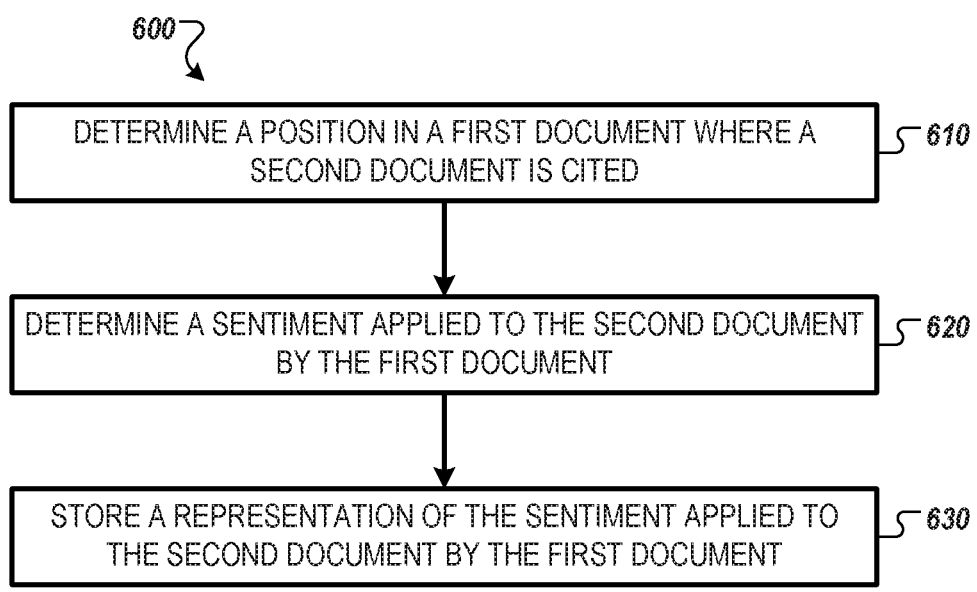
FIG. 6 is a flow chart illustrating an example method for determining a sentiment applied to a document.

FIG. 6 is a flow chart illustrating an example method 600 for determining a sentiment applied to a document. In some examples, the method 600 is implemented at the server 220, which accesses the data repository 230. In some examples, the method 600 is implemented after the method 500.

At operation 610, the server 220 determines, based on the text and the layout of the first document, a position in the first document where the second document is cited. The position in the first document where the second document is cited is determined, in some cases, by searching for a number or letter associated with the reference written in superscript or inside parentheses, braces, or brackets, within the first document. For example, as shown in FIG. 1, reference [1] is cited in the second line of the introduction section, reference [2] is cited in the first line of the discussion section, and reference [3] is cited in the third line of the discussion section.

At operation 620, the server 220 determines, by applying natural language processing (NLP) to text surrounding the position in the first document where the second document is cited, a sentiment applied to the second document by the first document. The sentiment can be, for example, positive, neutral, negative, reproducible, not reproducible, and the like. For instance, in FIG. 1, the text surrounding reference [2] is: "Widget-Type-D, proposed by Duck [2], works very well and does everything that it is expected to do . . . Widget-Type-D should be used," showing a positive sentiment. The text surrounding reference [3] is "Widget-Type-E, proposed by Bear [3] does not work for its intended purpose and damages easily . . . Widget-Type-E should not be used," showing a negative sentiment. The text surrounding reference [1] is: "An overview discussion of widgets is provided in Mouse [1] which discusses Widgets-Type-A, Widgets-Type-B, and Widgets-Type-C," showing a positive sentiment and suggesting that the reference [1] is background material in the field of the document 100 ("widgets"). In some cases, a second document may be cited multiple times by a first document. In these cases, the sentiment may be determined based on all of the citations of the second document, from the first document, taken together, and thereby providing a stronger signal of the sentiment towards the second document by the first document. In some examples, an additional machine learning model is used that annotates the full text of the first document. An example of annotated text from a document is shown in Table 3, below.

TABLE 3

Annotated Text that <paragraph>
the <paragraph>
reference <paragraph>
[1] <citation_marker>
is <paragraph>
background <paragraph>
in <paragraph>
Figure <figure_marker>
1 <figure_marker>

At operation 630, the server 220 stores, within the data repository 230 and in conjunction with an edge (e.g., edge 335) between the first document and the second document, a representation of the sentiment applied to the second document by the first document. After operation 630, the method 600 ends.

The results of the operations 610-630 can be used in different ways. In some examples, the server 220 accesses, within the data repository 230, multiple edges—including the edge between the first document and the second document—associated with citations to the second document. The server 220 computes, based on the sentiment of the multiple edges, a representation of the overall sentiment applied to the second document. An example of an overall sentiment is: 80% positive, 5% neutral, and 15% negative; 30% reproducible, 5% not reproducible. Using the overall sentiment, an overall opinion of the community (e.g., community of researchers or scholars) on a document can be determined.

In some cases, the sentiment is determined based, in part, on a section of the first document that includes the position in the first document where the second document is cited. For example, in FIG. 1, the reference [1] is cited in the introduction section, suggesting that the reference [1] is associated with a well-established work in the field of the document 100 ("widgets"). References [2] and [3] are cited in the discussion section, suggesting that the references [2] and [3] are more novel works that are still subject to analysis, review or criticism.

As discussed in conjunction with FIG. 6, a single citation to a second document, from a first document, is analyzed to determine the sentiment. However, in some cases, the second document is cited by the first document multiple times. In these cases, the multiple citations to the second document can all be analyzed together to determine the sentiment of the first document to the second document. In some cases, the citations are all similar. For example, all of the citations may praise the second document as being correct and reproducible. In other cases, the citations may be contradictory stating, for example, that one part of the second document is correct and reproducible, while another part is not reproducible and appears incorrect. This more nuanced analysis may be more interesting to a scholar reading the second document and may inspire the scholar to study the first document after studying the second document. The scholar may be directed, from the second document to the first document, for example, based on information (e.g., edges 335) in the data repository 230.

According to some implementations, the server 220 determines, based on the citation or based on text at a position in a first document where a second document is cited, a part of the second document associated with the citation. The server provides, within the second document and adjacent to the part of the second document associated with the citation, an indication that the first document cites the second document and a selectable link for viewing the first document. These implementations are discussed in greater detail in conjunction with FIG. 7.

FIG. 7 is a user interface diagram illustrating an example of incorporation of an excerpt from a citing document in the display of a document being cited. The user interface may be presented at the client device 210, and may be transmitted to the client device 210 from the server 220. The server 220 may generate the user interface based on data from the data repository 230. The user interface diagram of FIG. 7 includes a portion of a document 700. The document 700 may correspond to one of the documents 330 in the document graph 320 of the data repository 230. The displayed portion of the document 700 is cited by another document (e.g., another document 330 in the document graph 320), as determined based on information, such as an edge 335, stored in the data repository 230. This information is indicated in the block 710, which displays information about a "citation referencing this paper." In some cases, the block 710 includes a selectable link (e.g., a hyperlink) for viewing the other document (the citing document) that cites the displayed portion of the document 700. As shown, the block 710 includes information about the authors of the other document, information that the other document is an article, and a quoted portion of the other document relevant to its discussion of the document 700. The block 710 also includes a "reply" link, which allows the viewer to make a comment about the citation.

In various embodiments, publications displayed to users are enriched with information about selected citing publications, for example, interspersed with the displayed publication text (in separate boxes or otherwise visually distinct). FIG. 7 shows an example user interface diagram. In addition to bibliographic data and a link to the citing publication in block 710, the incorporated citation information may include, as depicted, a brief excerpt from the citing publication surrounding mention of the cited publication (in this case, "Hofmayer et al., 2009"). In addition, the citation sentiment (e.g., whether the citation was cited negatively or positively) may be displayed (not shown). The citation information may be embedded in a portion of the cited publication to which the citation pertains, if ascertainable. In this manner, the user is notified of relevant citations in the proper context of both the citing publication and the cited publication. For frequently cited publications, a (usually small) subset of the citing publications may be selected for display based on criteria such as the impact of the citing publication, the prominence of the cited publication within the citing publication, and the importance of the section where the citation occurs.

In various implementations, the block 710 may include a citation context. One purpose of the citation context is to quickly provide a large amount of context to the viewer. The citation context can include a minimum meaningful amount of digestible text surrounding the citation in the citing document. The citation context can provide additional information about the cited publication to deepen or increase the reader's insight. For example, the reader can learn that other scholars agreed or disagreed with all or a portion of the information presented in the document 700. The reader can learn whether others were able to reproduce the results or experiment of the document 700. In some cases, the context of the citation in the block 710 is analyzed to determine a sentiment of the surrounding text. The determined sentiment is stored together with the citation, for example, as an edge 335 as illustrated in FIG. 3.

One challenge is determining the most relevant citing documents to display. For example, the document 700 may be cited in one hundred other documents, but only have enough space for twenty blocks similar to block 710. In some implementations, the citing documents to display re selected based on several factors including: location of the citation within the citing document; number of times the document 700 is cited by the citing document; number of neighboring citations within a threshold number of words, lines, or sentences, of the citation to the document 700 in the citing document; how controversial is the sentiment of the citing document to the document 700; how influential is the citing document; and the like. In terms of the location of the citation within the citing document, a citation in one part of the citing document, such as the conclusion, may be more meaningful than a citation in another part of the document, such as the introduction. In terms of the number of neighboring citations within a threshold number of words, lines, or sentences, of the citation to the document 700 in the citing document, a citing document that lists the document 700 as one of several citations may be less meaningful than a citing document that cites the document 700 by itself and provides discussion relevant to the document 700. How controversial is the sentiment of the citing document to the document 700 can be determined using the sentiment analysis techniques described herein. How influential is the citing document can be determined based on a number of citations or other consumption statistics (e.g., number of web accesses, number of downloads, number of comments, number of likes or shares in a social networking service, and the like) of the citing document.

In one specific implementation, the server 220 receives a set of candidate citing documents for display within the document 700. For each document from the set of candidate citing documents, the server computes two scores. The first score is computed based on the sentiment of the citation to the document 700 within the candidate citing document. The second score analyzes a value of the citation context within the candidate citing document. The value may be determined based on factors including: location of the citation within the candidate citing document; number of times the document 700 is cited by the candidate citing document; number of neighboring citations within a threshold number of words, lines, or sentences, of the citation to the document 700 in the candidate citing document; and the like. Citing documents to be placed in the block 710, and similar blocks, are selected from the set of candidate citing documents based on the first score and the second score.

In some cases, the content presented in the block 710 is stored in conjunction with the edge 335 in the data repository 230, or within the edge 335 that links the document 700 and the citing document. The block 710 may contain text around the citation reference, a section name, and an indication of the position (e.g., background, discussion, results, or conclusion section) of the citation in the citing document.

Figure 8:
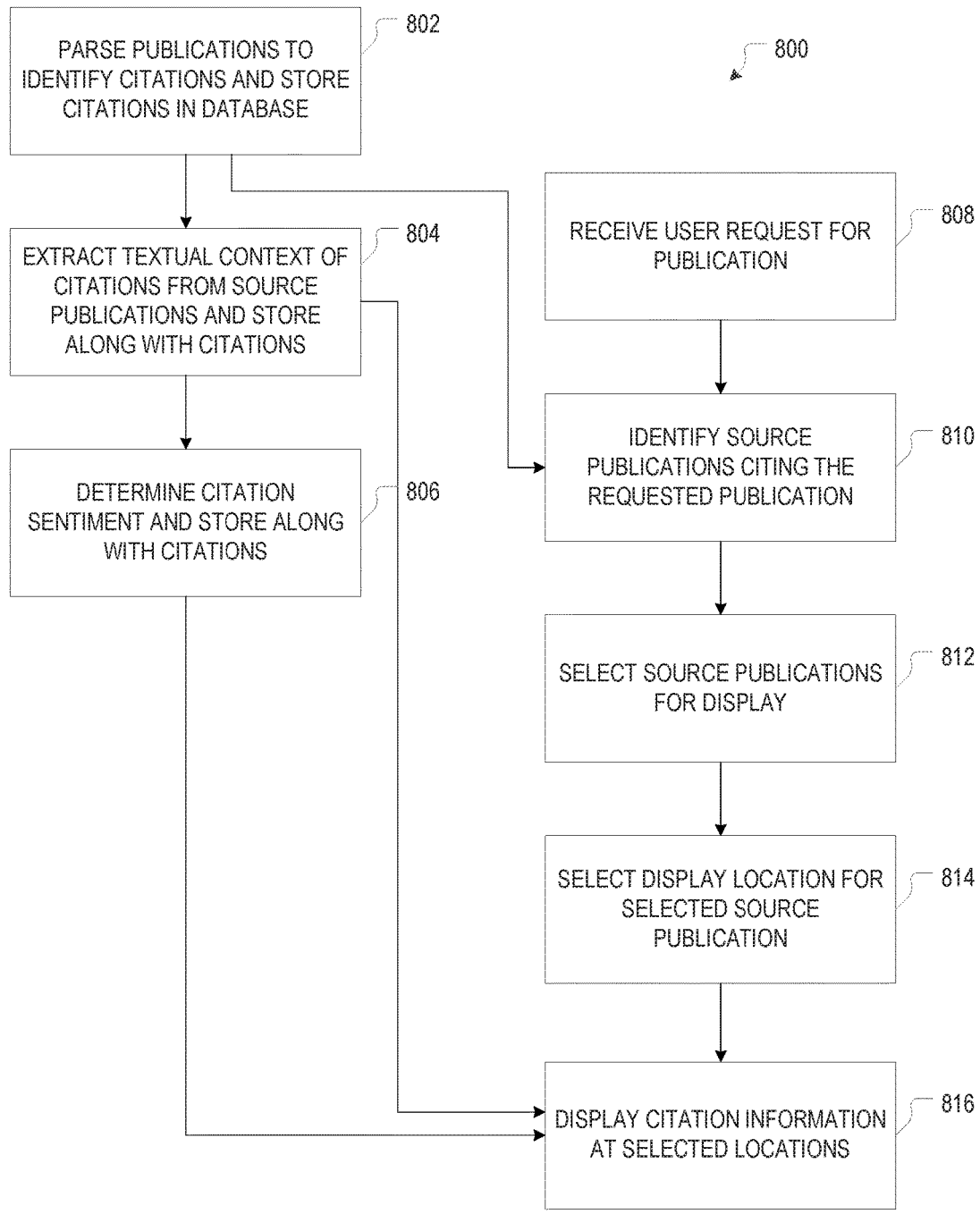
FIG. 8 is a flow chart illustrating an example method for mining citation information and incorporating the mined citation information into the display of the cited publication.

FIG. 8 is a flow chart for a method 800, in accordance with some embodiments, for mining citation information and incorporating it into the display of the cited publications.

The method 800 involves, at operation 802, parsing a plurality of publications to identify citations therein, and storing the citations in a data repository (e.g., data repository 230). This operation is usually performed independently of any user requests for publications and before the extracted citations are displayed in the context of a given cited publication. For example, citations may be identified, (e.g., by the server 220 of FIG. 2), at the time a new publication is submitted to and entered into the system. Each citation entry in the database includes at least an identifier (e.g., the document key) of the citing publication (hereinafter also the "source publication") and an identifier of the cited publication (hereinafter also the "target publication"). The database may be bidirectional in that it can be searched both by source publication and by target publication.

The method 800 may further include extracting relevant portions of text from the source publications, and storing the extracted text excerpts in the respective citation entries in the database (operation 804). The length of an excerpt may be chosen with a view towards providing sufficient contextual information (e.g., to convey the proposition, research result, or subject matter for which the target publication was cited) without overburdening the reader, when the excerpt is subsequently displayed along with the target publication, with extraneous content not pertinent to the target publication. The beginning and end of the excerpted text may be determined manually or automatically. If determined automatically, they may be based on a fixed number of words (e.g., ten words preceding and ten words following the citation) or a specified grammatical or stylistic unit containing the citation (e.g., a sentence or sentence clause, as may be determined based on punctuation, or a paragraph as may be determined based on whitespace). Alternatively, the excerpt length may vary depending on the context of the citation, and may be determined dynamically based on keywords or other semantic clues. For example, the excerpt may be sized so that it encompasses keywords also found in the target publication. Alternatively, the size of the excerpt may be chosen to best isolate the citation at issue from other citations in its vicinity. In some instances, such techniques may result in an excerpt that is only one sentence long (or less), whereas, in other instances, it may result in excerpts spanning multiple sentences or even paragraphs.

The excerpt from the source publication (or a smaller or larger portion of text surrounding the citation) may further be analyzed to determine the sentiment of the citation, which may likewise be stored in the citation entry (operation 806). The sentiment may be classified simply as positive or negative, or possibly neutral, or may, alternatively, be characterized at a finer level as, e.g., supporting a statement made in the source publication, providing related additional information on something (e.g., a material, technique, theory, etc.) referenced in the source publication, contradicted by a result expressed in the source publication, consistent or inconsistent with other publications cited in the source publication. In some embodiments, sentiment analysis is performed based on a dictionary of sentiment indicators. For example, language such as "as [authors of cited publication] have shown . . . " may be taken as an indicator of a citation to a supporting publication, that is, a positive citation, and language such as "contrary to the conclusion reached by/in [authors of cited publication] . . . " may be taken as an indicator of a negative citation.

In response to receipt of a user request for a particular publication (at operation 808), the citation database may be queried, at operation 810, to identify source publications citing the requested publication. The identified source publications are candidates for display along with the requested publication. In many cases, the number of citing publications will be too large to practically allow for the inclusion of each of them (or render such inclusion desirable). In this circumstance, one or more of the citing publications may be selected based on various criteria (operation 812). For example, source publications in which the target publication is prominent may be preferred over source publications that list the target publication at issue as one of many cited publications (e.g., within the same paragraph or sentence) and/or in a publication section (such as the introduction or background) that suggests use of the target publication as general background information rather than information relevant to, e.g., a specific proposition or result. Further, source publications that are more recent, more influential (as measured, e.g., in terms of the number of citations they themselves receive, or in terms of the impact factor), more popular (as measured, e.g., in terms of consumption metrics such as views or downloads), or more controversial (as measured, e.g., in terms of the number of comments they receive and the difference in sentiments of these comments) than others may be more likely to be selected for display. Similarly, if a citation itself has been proven of generally great interest, as can be gleaned from click-through rates, this may be a factor in favor of including it. In fact, the selection of citations incorporated into the display of a given (target) publication may be adjusted based on tracked user interactions with the citations. Thus, after an initially selected citation has been displayed to a certain number of users without ever having been clicked at, it may be dropped from the list of citations to be displayed alongside the publication. In some embodiments, the source publications to be displayed along with a target publication are precomputed or, alternatively, saved once they have been determined upon the first user request for the target publication. The selected source publications may, for instance, be marked for inclusion in the data repository 230. Alternatively or additionally, an assembled web page including the target publication as well as citation information about relevant selected source publications may be cached for later retrieval in response to a request for the target publication.

The location within the target publication at which citation information about a particular source publication is displayed is chosen (at operation 814), in accordance with various embodiments, to put the citation into relevant context and/or to improve its exposure to the user. For example, if the citation itself explicitly identifies a page, section, or other portion of the cited publication, the citation information may be embedded into or displayed adjacent that referenced portion. If the citation merely references the target publication as a whole, a particular portion for which the target publication was cited may nonetheless be ascertainable, in some cases, based on keywords or key phrases. For example, in the example of FIG. 7, the portion of the target publication into which the citation information is placed mentions the virus HAdV-31, which is also recited in the text snippet extracted from the source publication. In cases where the most pertinent document portion of the target publication cannot be determined with sufficient confidence, the choice of the display location may default to a section that has experienced particularly high levels of user interactions, or simply a section that is assumed to receive the most views (e.g., the first page) or is of most interest to users (e.g., the conclusion). The citation information (including, if available, text excerpts from the source publication and sentiment) of the selected source publications is then displayed at the selected locations within the target publication (operation 816).

Figure 9:
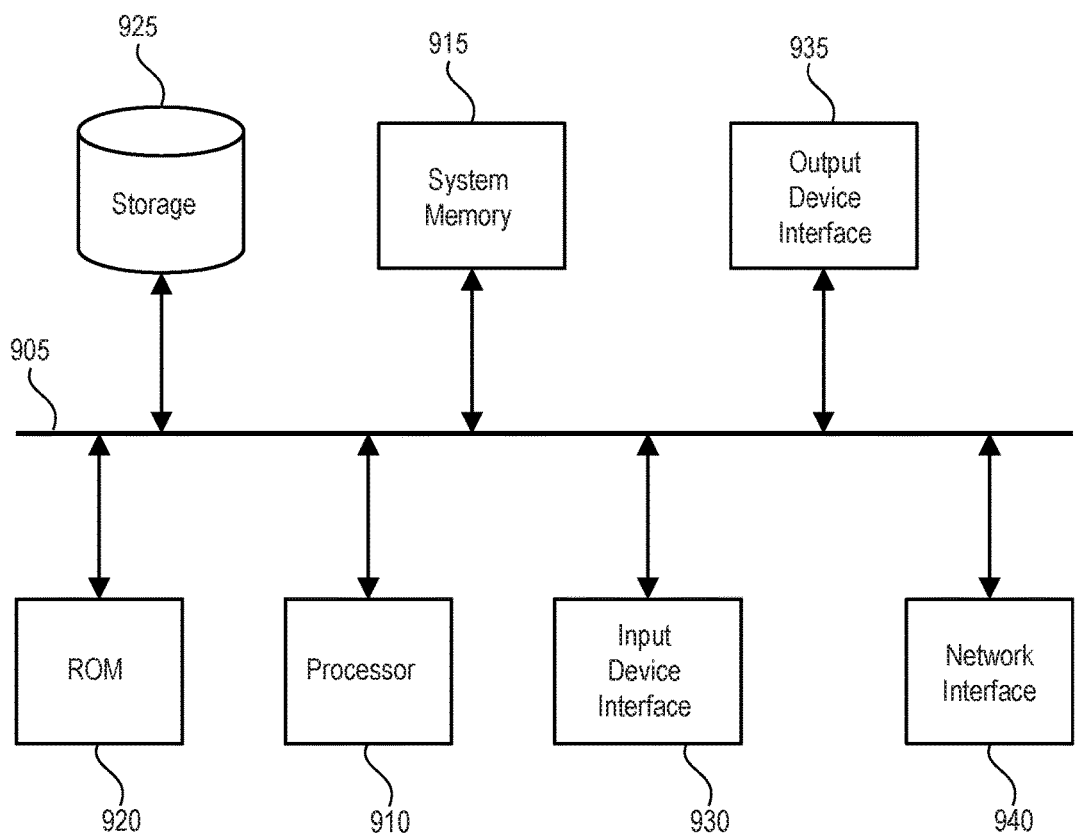
FIG. 9 conceptually illustrates an example electronic system with which some implementations of the subject technology can be implemented.

FIG. 9 conceptually illustrates an electronic system 900 with which some implementations of the subject technology are implemented. For example, one or more of the client device 210, the server 220, or the data repository 230 may be implemented using the arrangement of the electronic system 900. The electronic system 900 can be a computer (e.g., a mobile phone, PDA), or any other sort of electronic device. Such an electronic system includes various types of computer-readable media and interfaces for various other types of computer-readable media. Electronic system 900 includes a bus 905, processor(s) 910, a system memory 915, a read-only memory (ROM) 920, a permanent storage device 925, an input device interface 930, an output device interface 935, and a network interface 940.

The bus 905 collectively represents all system, peripheral, and chipset buses that communicatively connect the numerous internal devices of the electronic system 900. For instance, the bus 905 communicatively connects the processor(s) 910 with the read-only memory 920, the system memory 915, and the permanent storage device 925.

From these various memory units, the processor(s) 910 retrieves instructions to execute and data to process in order to execute the processes of the subject technology. The processor(s) can include a single processor or a multi-core processor in different implementations.

The read-only-memory (ROM) 920 stores static data and instructions that are needed by the processor(s) 910 and other modules of the electronic system. The permanent storage device 925, on the other hand, is a read-and-write memory device. This device 925 is a non-volatile memory unit that stores instructions and data even when the electronic system 900 is off. Some implementations of the subject technology use a mass-storage device (for example a magnetic or optical disk and its corresponding disk drive) as the permanent storage device 925. Other implementations use a removable storage device (for example a floppy disk, flash drive, and its corresponding disk drive) as the permanent storage device 925.

Like the permanent storage device 925, the system memory 915 is a read-and-write memory device. However, unlike storage device 925, the system memory 915 is a volatile read-and-write memory, such as a random access memory. The system memory 915 stores some of the instructions and data that the processor 910 needs at runtime. In some implementations, the processes of the subject technology are stored in the system memory 915, the permanent storage device 925, or the read-only memory 920. For example, the various memory units include instructions for linking documents using citations in accordance with some implementations. From these various memory units, the processor(s) 910 retrieves instructions to execute and data to process in order to execute the processes of some implementations.

The bus 905 also connects to the input and output device interfaces 930 and 935. The input device interface 930 enables the user to communicate information and select commands to the electronic system 900. Input devices used with input device interface 930 include, for example, alphanumeric keyboards and pointing devices (also called "cursor control devices"). Output device interfaces 935 enable, for example, the display of images generated by the electronic system 900. Output devices used with output device interface 935 include, for example, printers and display devices, for example cathode ray tubes (CRT) or liquid crystal displays (LCD). Some implementations include devices, for example a touch screen, that function as both input and output devices.

Finally, as shown in FIG. 9, bus 905 also couples electronic system 900 to a network (not shown) through a network interface 940. In this manner, the electronic system 900 can be a part of a network of computers (for example a local area network (LAN), a wide area network (WAN), or an Intranet, or a network of networks, for example the Internet. Any or all components of electronic system 900 can be used in conjunction with the subject technology.

Figure 10:
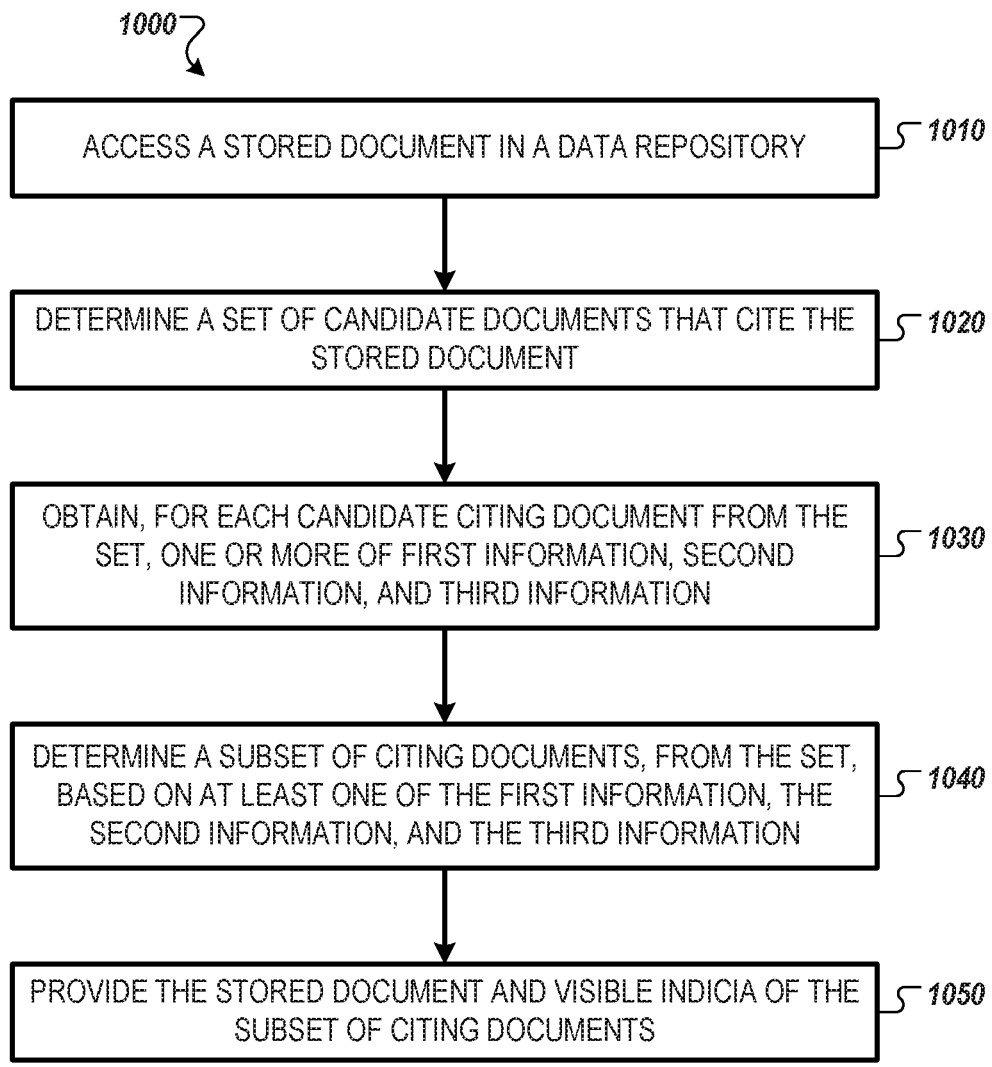
FIG. 10 is a flow chart illustrating an example method for providing visible indicia of citing documents.

FIG. 10 is a flow chart illustrating an example method 1000 for providing visible indicia of citing documents. The method 1000 may be implemented at the server 220 of FIG. 2.

The method 1000 begins at operation 1010, where the server 220 accesses a stored document (e.g., document 330 or document 700) in the data repository 230. The server 220 may access the document in order to provide the document for display at a client device 210, either in response to a request from the client device 210 or in preparation for a possible future request.

At operation 1020, the server 220 determines a set of candidate documents (e.g., documents 330) that cite the stored document. In one example, the set of candidate documents is determined by accessing the document graph 320, which includes nodes representing documents 330 and edges 335 representing citations; finding a node representing the stored document in the document graph 320; and determining the set of candidate citing documents based on edges to the node (representing citations to the stored document).

At operation 1030, the server 220 obtains, for each candidate citing document from the set, one or more of first information, second information, and third information. Any combination of one or more of the first, second, and third information may be obtained. In one example, only the first information and the second information are obtained. The first information includes information about the candidate citing document taken as a whole, such as information representing an impact (e.g., on a field of research or scholarship) of the candidate citing document. The second information includes a representation of a citation context of the citation to the stored document within the candidate citing document. The second information may include data directed to how the stored document is cited within the candidate citing document. The third information includes information about a viewer accessing the stored document.

The first information is different from the second information. In some examples, the first information includes one or more reputation information of one or more of: the candidate citing document, an author of the candidate citing document, and a publisher of the candidate citing document. In some examples, the first information includes one or more of a date of the candidate citing document, a country of the candidate citing document, a journal of the candidate citing document, a score associated with an author of the candidate citing document, a type of publication of the candidate citing document, and metadata of the citing publication of the candidate citing document. In some examples, the second information includes one or more of a position of the citation to the stored document in the candidate citing document (e.g., in the introduction, body, or conclusion of the candidate citing document), a sentiment applied to the stored document in the candidate citing document, and a number of other citations proximate to the citation to the stored document in the candidate citing document. The reputation of an author may be computed as a function of the overall sentiments or citations to the author's aggregated works. The reputation of an author may represent the author's importance in his/her field or the sentiment of other prominent figures in the field to the author's works.

In some cases, the first information includes a first numeric score, the second information includes a second numeric score, and the third information includes a third numeric score. The first numeric score is computed based on data in the first information. The second numeric score is computed based on data in the second information. The third numeric score is computed based on data in the third information.

The third information includes, in some cases, an expertise of the viewer, subject matter of interest to the viewer, a position or career level of seniority of the viewer, and the like. If the viewer is a member of a social networking service, all or a portion of the third information may be obtained from the social networking service, after receiving permission from the viewer to access his/her data stored at the social networking service. The expertise of the viewer may be determined based on other documents accessed by the viewer or the viewer's position or job title. For example, a senior computer programmer is likely to be an expert in programming, and interested in citing documents related to programming. Similarly, a medical doctor may be interested in citing documents related to medicine, and a pharmacist may be interested in citing documents related to pharmacy. The interest of the viewer may be determined based on documents accessed by the viewer, with a strong focus on documents accessed recently (e.g., within the last day, week, or month). For example, a viewer who read several documents about Paris is likely to be interested in Paris (and would be interested in citing documents discussing Paris). The seniority level of the viewer is relevant in determining a type of citing documents in which the viewer may be interested. For instance, a junior researcher may be interested in literature overview citing documents, while a senior researcher may be interested in citing documents discussing cutting edge research. In some cases, the third information is represented as a third numeric score. In some cases, the third information includes a set of documents previously accessed by the viewer and social networking profile data of the viewer.

In some cases, the data repository 230 may be coupled with a social networking service, and may store the profile data (not illustrated) of viewers of the documents 330. The subject technology may be implemented within the social networking service. Alternatively, with permission from the viewers, the social networking data (e.g., profile data) may be obtained from an external social networking service.

The different types of information are summarized in Table 4.

TABLE 4

Types of Information Accessed by Some Implementations

| | |
|---|---|
| First Information | Information about the candidate citing document taken as a whole; information representing an impact of the candidate citing document |
| Second Information | Information about the citation context of the citation to the stored document within the candidate citing document |
| Third Information | Information about a viewer accessing the stored document |

According to some examples, a first numeric score, corresponding to the first information, is computed based on one or more of: a total number of citations to the candidate citing document, a total consumption metric of the candidate citing document, a number of citations to the candidate citing document in a given time period (e.g., the year 2015), an a consumption metric of the citing document in the given time period. The consumption metric may include or be calculated based on one or more of: a number of times the document was accessed, a number of times the document was downloaded, a number of comments provided for the document, a number of "likes" or "shares" of the document in a social networking service, and the like. In some cases, the first numeric score may be computed using the PageRank algorithm, developed by Google Corporation of Mountain View, Calif., or a similar algorithm.

In some cases, obtaining the second information, which includes the second numeric score, includes the server 220 determining, for each candidate citing document from the set, a sentiment applied to the stored document, and computing the second numeric score based, at least in part, on a uniqueness of the sentiment, compared to other sentiments, and based on a complexity or nuance of the sentiment. A sentiment is unique if it is different from the sentiment of other candidate citing documents. For example, if nine candidate citing documents find the stored document's results reproducible, and one candidate citing document finds the stored document's results irreproducible, the one candidate citing document is unique. A sentiment is complex or nuanced if the sentiment provides detailed analysis of the stored document. For example, a complex or nuanced sentiment may mention that some of the results are reproducible, while others are not, or may agree with some information of the stored document, while disagreeing with other information.

In some cases, the second information includes one or more of: a location of the citation to the stored document within the candidate citing document, a number of times the stored document is cited by the candidate citing document, and a number of neighboring citations within a threshold number (e.g., five or ten) of words, lines, or sentences, of the citation to the stored document within the candidate citing document. The above factors may be combined, using a mathematical function, to compute the second score.

At operation 1040, the server 220 determines a subset of citing documents, from the set of candidate citing documents, based on at least one of the obtained first information, the obtained second information, and the obtained third information. Any combination of one or more of the first, second, and third information may be used. In one example, only the first information and the second information are used. In some cases, the server 220 determines, based on an amount of content (e.g., text and figures) and a layout of the stored document, a number N of citing documents for the subset. The server 220 selects, based on application of one or more rules or mathematical functions (e.g., if numeric scores are used) to the first information and the second information, N candidate citing documents from the set for placement into the subset. The value N may be larger for longer documents. For example, N may correspond to the number of words in the document divided by 250, rounded to the nearest integer. In some cases, the value N may be adjusted based on figures in the document to avoid overlaying citing document information over a figure. In some cases, the value N may be adjusted based on the layout of the document. For example, if a document includes more blank or white space than is typical, this blank or white space may be used to place citing document information.

Alternatively, if the first information, the second information, and/or the third information are expressed as numeric scores, the server 220 computes, for each candidate citing document in the set, an overall score based on a mathematical function (e.g., sum, product or other discrete function) of one or more of the first numeric score, the second numeric score, and the third numeric score, each of which may be weighted using a weighting factor. The weighting factor may be learned by machine learning and may be dynamically adjusted (e.g., in a self-learning or unsupervised learning algorithm) based on viewer interaction with citing documents, in order to provide the most relevant citing documents with which viewers (of the stored document) are most likely to interact. For each candidate citing document, the server 220 places the candidate citing document into the subset if the overall score of the candidate citing document is within a predefined range.

In another alternative, instead of a numeric score, a set of rules may be applied for determining, based on the first, second, and/or third information, which of the candidate citing documents to place in the subset. A rule for the first information may be that the candidate citing document is written by an author who has a certain title (e.g., professor or senior researcher) or reputation. A rule for the second information may be that the stored document is cited without any neighboring citations within 10 words of the citation to the third document. A rule for the third information may be that, if the viewer is interested in physics, to select candidate citing documents related to physics. In additional examples, a rule includes that, in order to be placed in the subset, a document exceeds a threshold importance value, is more controversial than a threshold value, or is less controversial than a threshold value.

In some cases, machine learning may be used to determine how to combine the first information, the second information, and/or the third information to select the subset. The input for the machine learning algorithm may include the citing documents presented with any stored document and whether a citing document was subsequently accessed by a user viewing the stored document. The machine learning algorithm may record a score of "1" if a citing document is accessed, and a score of "0" if a citing document is not accessed, and may be programmed to increase the total of the recorded scores. Any known machine learning algorithm can be used in this context. In some specific examples, Markov models, random forest, or classification and regression trees are used.

At operation 1050, the server 220 provides a digital transmission of the stored document (e.g., document 700), including visible indicia (e.g., block 710) of the subset of citing documents, for display at the client device 210. In some implementations, the visible indicia include a snippet of text from the associated citing document and a selectable link (e.g., hyperlink) for viewing the associated citing document. In some examples, the visible indicia include blocks (e.g., block 710) embedded in the stored document (e.g., document 700). Alternatively, the visible indicia may have any shape or any position. The visible indicia may include blocks, boxes, circles, chat bubbles, and the like. The visible indicia may be embedded within the stored document or presented alongside the stored document. In some cases, as discussed above, the overall sentiment may be computed for the stored document and an indication of the overall sentiment may be transmitted for display along with the stored document. After operation 1050, the method 1000 ends.

In some cases, the server 220 receives feedback that a viewer (or multiple viewers) interacted with one of the citing documents from the subset. The server 220 adjusts, based on the feedback, one or more rules for determining the subset based on the first information and/or the second information. The server 220 modifies the subset of citing documents based on the adjusted one or more rules. The server 220 provides a digital transmission of the stored document, including visible indicia of the modified subset of citing documents, for display at a second client device 210, which may be different from the client device to which the stored document is transmitted in step 1050. As described above, only the rules based on the first information and/or the second information are adjusted. However, in some cases, the rules based on the third information may be adjusted also, for example, if multiple viewers who have similar third information (e.g., multiple viewers who are medical doctors) all interact with similar citing documents from the subset. In summary, in some aspects of the subject technology, the server 220 learns, from the consumption pattern of the stored document and its citing documents, which features of the first information, second information, and/or third information are useful to generate the citing documents which will optimize user interaction therewith.

In some cases, the set or subset of citing documents, as well as a representation of the overall sentiment to the stored document, may be provided to an author of the stored document. The author may use the set or subset of citing documents, or the overall sentiment, to determine how others in his/her field reacted to the stored document or to select a direction for future research or investigation related to the stored document.

The subject technology is described below in various clauses. The clauses are provided as examples only and do not limit the subject technology.

1. A method comprising:
   accessing a first document from a data repository, the first document comprising text arranged according to a layout;
   identifying, within the first document, a reference section based on the text and the layout;
   identifying a citation to a cited reference within the reference section based on the text and the layout within the reference section;
   extracting, from the citation, identifying information of the cited reference, the identifying information comprising one or more of a title, an author, a date, a publication, a page number, a journal, a volume, an issue number, or a date of issue;
   identifying, based on the identifying information of the cited reference, a second document corresponding to the cited reference; and
   storing, within the data repository, an edge between the first document and the second document, the edge identifying that the first document cites the second document.

2. The method of clause 1, further comprising:
   determining, based on the text and the layout of the first document, one or more positions in the first document where the second document is cited;
   determining, by applying natural language processing to text surrounding the one or more positions in the first document where the second document is cited, a sentiment applied to the second document by the first document; and
   storing, in conjunction with the edge between the first document and the second document, a representation of the sentiment applied to the second document by the first document.

3. The method of clause 2, further comprising:
   accessing, within the data repository, a plurality of edges, including the edge between the first document and the second document, associated with citations to the second document; and
   computing, based on sentiments of the plurality of edges, a representation of an overall sentiment applied to the second document.

4. The method of clause 2, wherein the sentiment comprises one or more of positive, neutral, or negative.

5. The method of clause 2, wherein the sentiment is determined based, in part, on one or more sections of the first document that comprises the one or more positions in the first document where the second document is cited.

6. The method of clause 1, further comprising:
   determining, based on the citation or based on text at a position in the first document where the second document is cited, a part of the second document associated with the citation; and
   providing, within the second document and adjacent to the part of the second document associated with the citation, an indication that the first document cites the second document and a selectable link for viewing the first document.

7. The method of clause 1, further comprising:
   overlaying the cited reference, within the first document, with a selectable link for viewing the second document.

8. The method of clause 1, wherein identifying the reference section comprises:
   identifying, within the first document, a plurality of sections, each section having a section header; and identifying, from among the plurality of sections, the reference section based on text in the section header.

9. The method of clause 1, wherein identifying the citation to the cited reference within the reference section comprises:

identifying the citation to the cited reference based on line endings and punctuation marks within the reference section.

10. The method of clause 1, wherein extracting, from the citation, identifying information of the cited reference comprises:

applying named entity recognition to extract the identifying information.

11. A non-transitory machine-readable medium comprising instructions which, when executed by one or more processors of a machine, cause the machine to perform operations comprising:

accessing a first document from a data repository, the first document comprising text arranged according to a layout;

identifying, within the first document, a reference section based on the text and the layout;

identifying a citation to a cited reference within the reference section based on the text and the layout within the reference section;

extracting, from the citation, identifying information of the cited reference, the identifying information comprising one or more of a title, an author, a date, a publication, a page number, a journal, a volume, an issue number, or a date of issue;

identifying, based on the identifying information of the cited reference, a second document corresponding to the cited reference; and storing, within the data repository, an edge between the first document and the second document, the edge identifying that the first document cites the second document.

12. The machine-readable medium of clause 11, the operations further comprising:

determining, based on the text and the layout of the first document, one or more positions in the first document where the second document is cited;

determining, by applying natural language processing to text surrounding the one or more positions in the first document where the second document is cited, a sentiment applied to the second document by the first document; and storing, in conjunction with the edge between the first document and the second document, a representation of the sentiment applied to the second document by the first document.

13. The machine-readable medium of clause 12, the operations further comprising:

accessing, within the data repository, a plurality of edges, including the edge between the first document and the second document, associated with citations to the second document; and computing, based on sentiments of the plurality of edges, a representation of an overall sentiment applied to the second document.

14. The machine-readable medium of clause 12, wherein the sentiment comprises one or more of positive, neutral, or negative.

15. The machine-readable medium of clause 12, wherein the sentiment is determined based, in part, on one or more sections of the first document that comprises the one or more positions in the first document where the second document is cited.

16. The machine-readable medium of clause 11, the operations further comprising:

determining, based on the citation or based on text at a position in the first document where the second document is cited, a part of the second document associated with the citation; and providing, within the second document and adjacent to the part of the second document associated with the citation, an indication that the first document cites the second document and a selectable link for viewing the first document.

17. The machine-readable medium of clause 11, the operations further comprising:

overlaying the cited reference, within the first document, with a selectable link for viewing the second document.

18. The machine-readable medium of clause 11, wherein identifying the reference section comprises:

identifying, within the first document, a plurality of sections, each section having a section header; and identifying, from among the plurality of sections, the reference section based on text in the section header.

19. The machine-readable medium of clause 11, wherein identifying the citation to the cited reference within the reference section comprises:

identifying the citation to the cited reference based on line endings and punctuation marks within the reference section.

20. A system comprising:

one or more processors; and a memory comprising instructions which, when executed by the one or more processors, cause the one or more processors to perform operations comprising:

accessing a first document from a data repository, the first document comprising text arranged according to a layout;

identifying, within the first document, a reference section based on the text and the layout;

identifying a citation to a cited reference within the reference section based on the text and the layout within the reference section;

extracting, from the citation, identifying information of the cited reference, the identifying information comprising one or more of a title, an author, a date, a publication, a page number, a journal, a volume, an issue number, or a date of issue;

identifying, based on the identifying information of the cited reference, a second document corresponding to the cited reference; and storing, within the data repository, an edge between the first document and the second document, the edge identifying that the first document cites the second document.

21. A non-transitory machine-readable medium comprising instructions which, when executed by one or more processors of a machine, cause the one or more processors to implement operations comprising:

accessing a stored document in a data repository;

determining a set of candidate citing documents that cite the stored document;

obtaining, for each candidate citing document from the set, first information representing an impact of the candidate citing document taken as a whole and second information representing a citation context within the candidate citing document;

determining a subset of citing documents, from the set of candidate citing documents, based on the obtained first information and the obtained second information; and providing a digital transmission of the stored document, including visible indicia of the subset of citing documents, for display at a client device.

22. The machine-readable medium of clause 21, wherein the visible indicia comprise a snippet of text from an associated citing document and a selectable link for viewing the associated citing document.

23. The machine-readable medium of clause 21, the operations further comprising:
obtaining, for each candidate citing document from the set, third information about a viewer accessing the stored document;
wherein determining the subset of citing documents comprises determining the subset of citing documents based on the third information.

24. The machine-readable medium of clause 23, wherein the third information comprises a set of documents previously accessed by the viewer and social networking profile data of the viewer.

25. The machine-readable medium of clause 21, wherein the first information comprises a first numeric score and wherein the second information comprises a second numeric score.

26. The machine-readable medium of clause 25, wherein the first numeric score is computed based on one or more of a total number of citations to the candidate citing document, a total consumption metric of the citing document, a number of citations to the candidate citing document in a given time period, and a consumption metric of the citing document in the given time period.

27. The machine-readable medium of clause 25, wherein obtaining the second information, which includes the second numeric score, comprises:
determining, for each candidate citing document from the set, a sentiment applied to the stored document;
computing, for each candidate citing document from the set, the second numeric score based at least in part on a uniqueness of the sentiment, compared to other sentiments, and based on a complexity or nuance of the sentiment.

28. The machine-readable medium of clause 25, wherein the second score is computed based on one or more of:
a location of the citation to the stored document within the candidate citing document,
a number of times the stored document is cited by the candidate citing document, and
a number of neighboring citations within a threshold number of words, lines, or sentences, of the citation to the stored document within the candidate citing document.

29. The machine-readable medium of clause 25, wherein determining the subset of citing documents comprises:
computing, for each candidate citing document in the set, an overall numeric score based on a mathematical function of the first numeric score and the second numeric score; and
for each candidate citing document, placing the candidate citing documents into the subset if the overall numeric score of the candidate citing document is within a defined range.

30. The machine-readable medium of clause 21, wherein determining the set of candidate citing documents that cite the stored document comprises:
accessing a graph within the data repository, the graph comprising nodes representing documents and edges representing citations;
finding a node representing the stored document within the graph; and
determining the set of candidate citing documents based on edges to the node.

31. The machine-readable medium of clause 21, wherein determining the subset of citing documents comprises:
determining, based on an amount of content and a layout of the stored document, a number N of citing documents for the subset; and
selecting, based on application of one or more rules or mathematical functions to the first information and the second information, N candidate citing documents from the set for placement into the subset.

32. The machine-readable medium of clause 31, wherein the first information comprises reputation information of one or more of: the candidate citing document, an author of the candidate citing document, and a publisher of the candidate citing document.

33. The machine-readable medium of clause 31, further comprising:
receiving feedback that a viewer interacted with one or more citing documents from the sub set;
adjusting, based on the feedback, one or more rules for determining the subset based on the first information and the second information;
modifying the subset of citing documents based on the adjusted one or more rules; and
providing a digital transmission of the stored document, including visible indicia of the modified subset of citing documents, for display at a second client device.

34. A system comprising:
one or more processors; and
a memory comprising instructions which, when executed by the one or more processors, cause the one or more processors to implement operations comprising:
accessing a stored document in a data repository;
determining a set of candidate citing documents that cite the stored document;
obtaining, for each candidate citing document from the set, first information representing an impact of the candidate citing document taken as a whole and second information representing a citation context within the candidate citing document;
determining a subset of citing documents, from the set of candidate citing documents, based on the obtained first information and the obtained second information; and
providing a digital transmission of the stored document, including visible indicia of the subset of citing documents, for display at a client device.

35. The system of clause 34, wherein the visible indicia comprise a snippet of text from an associated citing document and a selectable link for viewing the associated citing document.

36. The system of clause 34, the operations further comprising:
obtaining, for each candidate citing document from the set, third information about a viewer accessing the stored document;
wherein determining the subset of citing documents comprises determining the subset of citing documents based on the third information.

37. The system of clause 36, wherein the third information comprises a set of documents previously accessed by the viewer and social networking profile data of the viewer.

38. The system of clause 34, wherein the first information comprises a first numeric score and wherein the second information comprises a second numeric score.

39. The system of clause 38, wherein the first numeric score is computed based on one or more of a total number of citations to the candidate citing document, a total consumption metric of the citing document, a number of citations to the candidate citing document in a given time period, and a consumption metric of the citing document in the given time period.

40. A method comprising:
accessing a stored document in a data repository;

determining a set of candidate citing documents that cite the stored document;

obtaining, for each candidate citing document from the set, first information representing an impact of the candidate citing document taken as a whole and second information representing a citation context within the candidate citing document;

determining a subset of citing documents, from the set of candidate citing documents, based on the obtained first information and the obtained second information; and providing a digital transmission of the stored document, including visible indicia of the subset of citing documents, for display at a client device.

The above-described features and applications can be implemented as software processes that are specified as a set of instructions recorded on a computer-readable storage medium (also referred to as computer-readable medium). When these instructions are executed by one or more processor(s) (which may include, for example, one or more processors, cores of processors, or other processing units), they cause the processor(s) to perform the actions indicated in the instructions. Examples of computer-readable media include, but are not limited to, CD-ROMs, flash drives, RAM chips, hard drives, erasable programmable read-only memory (EPROM), etc. The computer-readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra-density optical discs, any other optical or magnetic media, and floppy disks. The computer-readable media can store a computer program that is executable by at least one processor and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms "display" or "displaying" mean displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or, in some cases, one or more of the illustrated steps may be omitted. Some of the steps may be performed simultaneously. For example, in certain circumstances, multitasking and parallel processing may be implemented. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but are to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, "an aspect," does not imply that the aspect is essential to the subject technology or that the aspect applies to all configurations of the subject technology. A disclosure relating to an aspect may apply to all configurations, or one or more configurations. A phrase, for example, "an aspect," may refer to one or more aspects and vice versa. A phrase, for example, "a configuration," does not imply that such configuration is essential to the subject technology or that such configuration applies to all configurations of the subject technology. A disclosure relating to a configuration may apply to all configurations, or one or more configurations. A phrase, for example, "a configuration," may refer to one or more configurations and vice versa.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the disclosed subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In this document, the terms "a" or "an" are used, as is common in patent documents, to include one or more than one, independent of any other instances or usages of "at least one" or "one or more." In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," and so forth are used merely as labels, and are not intended to impose numerical requirements on their objects.

What is claimed is:

1. A non-transitory machine-readable medium comprising instructions which, when executed by one or more processors of a machine, cause the one or more processors to implement operations comprising:

accessing a stored document in a data repository;

determining a set of candidate citing documents that cite the stored document;

obtaining, for each candidate citing document from the set, first information representing an impact of the candidate citing document taken as a whole on a field of study associated with the stored document and second information representing a citation context within the candidate citing document, wherein the citation context represents a number of citations or a location of citations to the stored document within the candidate citing document, wherein the first information comprises a first numeric score, and wherein the second information comprises a second numeric score;

determining a subset of citing documents, from the set of candidate citing documents, based on the obtained first information and the obtained second information; and providing a digital transmission of the stored document, including visible indicia of the subset of citing documents, for display at a client device, wherein:

the first numeric score is computed based on one or more of: a total number of citations to the candidate citing document, a total consumption metric of the citing document, a number of citations to the candidate citing document in a given time period, and a consumption metric of the citing document in the given time period; and the second numeric score is computed based on one or more of: a location of the citation to the stored document within the candidate citing document, a number of times the stored document is cited by the candidate citing document, and a number of neighboring citations within a threshold number of words, lines, or sentences, of the citation to the stored document within the candidate citing document.

2. The machine-readable medium of claim 1, wherein the visible indicia comprise a snippet of text from an associated citing document and a selectable link for viewing the associated citing document.

3. The machine-readable medium of claim 1, the operations further comprising:

obtaining, for each candidate citing document from the set, third information about a viewer accessing the stored document;

wherein determining the subset of citing documents comprises determining the subset of citing documents based on the third information.

4. The machine-readable medium of claim 3, wherein the third information comprises a set of documents previously accessed by the viewer and social networking profile data of the viewer.

5. The machine-readable medium of claim 1, wherein obtaining the second information, which includes the second numeric score, comprises:

determining, for each candidate citing document from the set, a sentiment applied to the stored document;

computing, for each candidate citing document from the set, the second numeric score based at least in part on a uniqueness of the sentiment, compared to other sentiments, and based on a complexity or nuance of the sentiment.

6. The machine-readable medium of claim 1, wherein determining the subset of citing documents comprises:

computing, for each candidate citing document in the set, an overall numeric score based on a mathematical function of the first numeric score and the second numeric score; and for each candidate citing document, placing the candidate citing documents into the subset if the overall numeric score of the candidate citing document is within a defined range.

7. The machine-readable medium of claim 1, wherein determining the set of candidate citing documents that cite the stored document comprises:

accessing a graph within the data repository, the graph comprising nodes representing documents and edges representing citations;

finding a node representing the stored document within the graph; and determining the set of candidate citing documents based on edges to the node.

8. The machine-readable medium of claim 1, wherein determining the subset of citing documents comprises:

determining, based on an amount of content and a layout of the stored document, a number N of citing documents for the subset; and selecting, based on application of one or more rules or mathematical functions to the first information and the second information, N candidate citing documents from the set for placement into the subset.

9. The machine-readable medium of claim 1, wherein the first information comprises reputation information of one or more of: the candidate citing document, an author of the candidate citing document, and a publisher of the candidate citing document.

10. The machine-readable medium of claim 1, further comprising:

receiving feedback that a viewer interacted with one or more citing documents from the subset;

adjusting, based on the feedback, one or more rules for determining the subset based on the first information and the second information;

modifying the subset of citing documents based on the adjusted one or more rules; and providing a digital transmission of the stored document, including visible indicia of the modified subset of citing documents, for display at a second client device.

11. A system comprising:

one or more processors; and a memory comprising instructions which, when executed by the one or more processors, cause the one or more processors to implement operations comprising:

accessing a stored document in a data repository;

determining a set of candidate citing documents that cite the stored document;

obtaining, for each candidate citing document from the set, first information representing an impact of the candidate citing document taken as a whole on a field of study associated with the stored document and second information representing a citation context within the candidate citing document, wherein the citation context represents a number of citations or a location of citations to the stored document within the candidate citing document, wherein the first information comprises a first numeric score, and wherein the second information comprises a second numeric score;

determining a subset of citing documents, from the set of candidate citing documents, based on the obtained first information and the obtained second information; and providing a digital transmission of the stored document, including visible indicia of the subset of citing documents, for display at a client device, wherein:

the first numeric score is computed based on one or more of: a total number of citations to the candidate citing document, a total consumption metric of the citing document, a number of citations to the candidate citing document in a given time period, and a consumption metric of the citing document in the given time period; and the second numeric score is computed based on one or more of: a location of the citation to the stored document within the candidate citing document, a number of times the stored document is cited by the candidate citing document, and a number of neighboring citations within a threshold number of words, lines, or sentences, of the citation to the stored document within the candidate citing document.

12. The system of claim 11, wherein the visible indicia comprise a snippet of text from an associated citing document and a selectable link for viewing the associated citing document.

13. The system of claim 11, the operations further comprising:
obtaining, for each candidate citing document from the set, third information about a viewer accessing the stored document;
wherein determining the subset of citing documents comprises determining the subset of citing documents based on the third information.

14. The system of claim 13, wherein the third information comprises a set of documents previously accessed by the viewer and social networking profile data of the viewer.

15. A method comprising:
accessing a stored document in a data repository;
determining a set of candidate citing documents that cite the stored document;
obtaining, for each candidate citing document from the set, first information representing an impact of the candidate citing document taken as a whole on a field of study associated with the stored document and second information representing a citation context within the candidate citing document, wherein the citation context represents a number of citations or a location of citations to the stored document within the candidate citing document, wherein the first information comprises a first numeric score, and wherein the second information comprises a second numeric score;
determining a subset of citing documents, from the set of candidate citing documents, based on the obtained first information and the obtained second information; and
providing a digital transmission of the stored document, including visible indicia of the subset of citing documents, for display at a client device, wherein:
the first numeric score is computed based on one or more of: a total number of citations to the candidate citing document, a total consumption metric of the citing document, a number of citations to the candidate citing document in a given time period, and a consumption metric of the citing document in the given time period; and
the second numeric score is computed based on one or more of: a location of the citation to the stored document within the candidate citing document, a number of times the stored document is cited by the candidate citing document, and a number of neighboring citations within a threshold number of words, lines, or sentences, of the citation to the stored document within the candidate citing document.

16. The method of claim 15, wherein the digital transmission causes display of a graphical user interface (GUI) at the client device, and wherein the GUI includes at least a portion of the stored document and the visible indicia of the subset of citing documents.

17. The method of claim 16, wherein the GUI includes a link for a user to of the client device to make a comment about a citation of a member of the subset of citing documents to the stored document.

18. The method of claim 17, wherein the comment is used to update the first information.

* * * * *

UNITED STATES PATENT AND TRADEMARK OFFICE
CERTIFICATE OF CORRECTION

PATENT NO. : 10,282,424 B2
APPLICATION NO. : 15/159028
DATED : May 7, 2019
INVENTOR(S) : Zholudev et al.

It is certified that error appears in the above-identified patent and that said Letters Patent is hereby corrected as shown below:

In the Claims

In Column 32, Line 34, in Claim 17, before "of", delete "to"

Signed and Sealed this
Eighth Day of December, 2020

Andrei Iancu
*Director of the United States Patent and Trademark Office*